United States Patent [19]
Healey

[11] Patent Number: 5,832,127
[45] Date of Patent: Nov. 3, 1998

[54] APPARATUS AND FAST METHOD FOR CONVEX-POLYGON BOUNDING OF CLOSED CONTOURS

[75] Inventor: Paul Donald Healey, San Jose, Calif.

[73] Assignee: International Business Machines Corporation, Armonk, N.Y.

[21] Appl. No.: 751,285

[22] Filed: Nov. 18, 1996

Related U.S. Application Data

[63] Continuation of Ser. No. 425,314, Apr. 17, 1995, abandoned, which is a continuation of Ser. No. 36,663, Mar. 24, 1993, abandoned.

[51] Int. Cl.[6] .................................................. G06K 9/48
[52] U.S. Cl. .......................................... 382/241; 382/216
[58] Field of Search ................................. 382/190, 199, 382/200, 201, 203, 216, 291, 296

[56] References Cited

U.S. PATENT DOCUMENTS

| | | | |
|---|---|---|---|
| 4,019,173 | 4/1977 | Kono | 382/46 |
| 4,115,803 | 9/1978 | Morton | 382/25 |
| 4,490,848 | 12/1984 | Beall et al. | 382/121 |
| 4,493,105 | 1/1985 | Beall et al. | 382/21 |
| 4,566,124 | 1/1986 | Yamamoto et al. | 382/22 |
| 4,628,532 | 12/1986 | Stone et al. | 382/25 |
| 4,704,694 | 11/1987 | Czerniejewski | 382/25 |
| 4,771,469 | 9/1988 | Wittenburg | 382/25 |
| 4,812,988 | 3/1989 | Duthuit et al. | 364/522 |
| 4,868,771 | 9/1989 | Quick et al. | 364/578 |
| 4,956,869 | 9/1990 | Miyatake et al. | 382/22 |
| 5,040,229 | 8/1991 | Lee et al. | 382/9 |
| 5,050,222 | 9/1991 | Lee | 382/21 |
| 5,058,182 | 10/1991 | Kuan et al. | 382/36 |
| 5,074,673 | 12/1991 | Sowell et al. | 356/5 |
| 5,086,478 | 2/1992 | Kelly-Mahaffey et al. | 382/8 |
| 5,159,645 | 10/1992 | Kumagai | 382/22 |
| 5,233,670 | 8/1993 | Dufour et al. | 382/22 |
| 5,267,328 | 11/1993 | Gouge | 382/16 |
| 5,319,722 | 6/1994 | Oki et al. | 382/46 |

FOREIGN PATENT DOCUMENTS

| | | | |
|---|---|---|---|
| 0 107 789 | 9/1983 | European Pat. Off. | G06K 9/46 |
| 0 106 354 | 10/1983 | European Pat. Off. | G06K 9/48 |
| 0 206 853 A1 | 5/1986 | European Pat. Off. | G06F 15/68 |
| 0 220 467 | 9/1986 | European Pat. Off. | G06K 9/48 |

OTHER PUBLICATIONS

Pattern Recognition, vol. 12 1980, Recognition of Hand-printed Characters by an Outermost Point Method, by Kazuhiko Yamamoto and Shunji Mori.

Patent Recognition Letters 85/1988, A Fast Approximation to a Convex Hull, by Zahid Hussain.

Yamamoto and Mori, "Recognition of Handprinted Characters by an Outermost Point Method", Pattern Recognition vol. 12, pp. 229–236, Pergamon Press Ltd., Aug. 1980.

*Primary Examiner*—Leo H. Boudreau
*Assistant Examiner*—Christopher S. Kelley
*Attorney, Agent, or Firm*—Gray Cary Ware Freidenrich

[57] ABSTRACT

An apparatus and computer-implemented polygon bounding method generate, in a first step, a binary array representation of a closed contour input object relative to a reference coordinate system. Subsequently, in a single pass through the binary array, a bounding polygon is generated as a sequence of parallel "bands," each representing a pair of opposing sides of the polygon. The polygon bands are oriented at successive generally uniform rotations of the reference coordinate system and are positioned to define the bounds of the closed contour for each rotation angle. The spacing and positioning of the bands can thus be used to define polygon size and position at each angle. In this way, comparisons between a plurality of polygons can be made systematically using defined geometrical criteria.

18 Claims, 4 Drawing Sheets

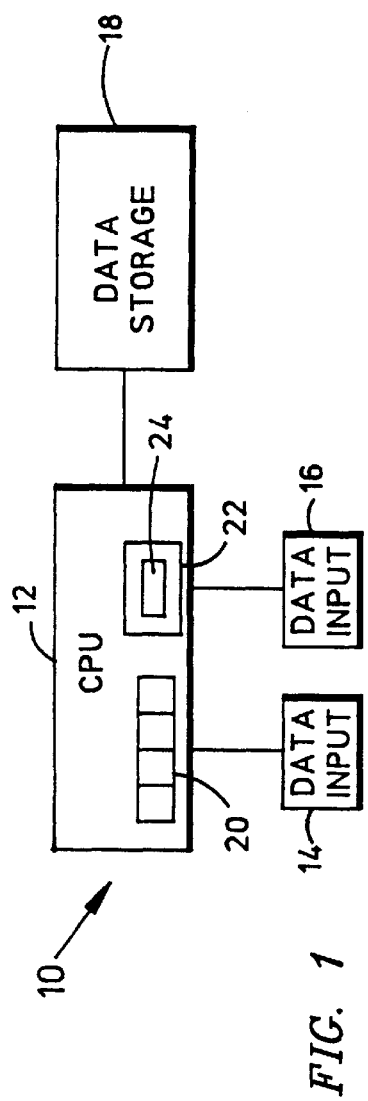
FIG. 1
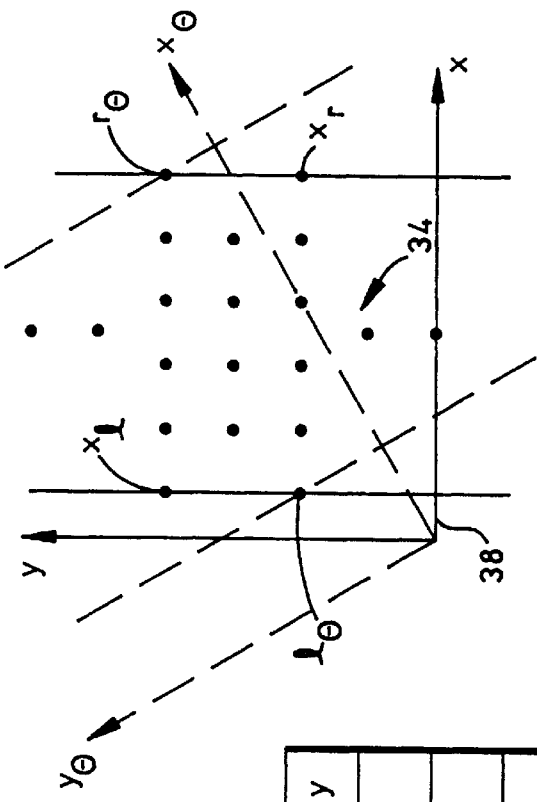
FIG. 3b
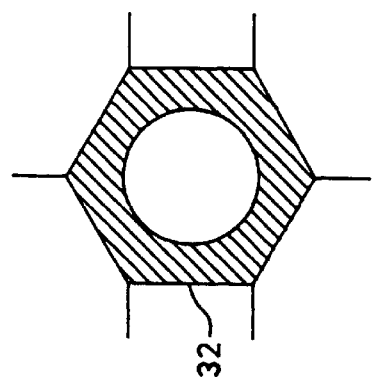
FIG. 3a
FIG. 4

APPARATUS AND FAST METHOD FOR CONVEX-POLYGON BOUNDING OF CLOSED CONTOURS

This application is a continuation of application Ser. No. 08/425,314, filed Apr. 17, 1995, now abandoned, which is a continuation of application Ser. No. 08/036,663, filed Mar. 24, 1993, now abandoned.

BACKGROUND OF THE INVENTION

The present invention relates generally to closed contour object characterization, and more particularly to the isolation and classification of closed contour objects using convex-polygon bounding structures.

It is sometimes convenient to isolate and characterize objects in two dimensional and three dimensional space by enclosing them within a defined polygon (or polyhedron in 3D) whose size and shape provide information about the objects they enclose. For example, bounding polygons can be used to distinguish the components of an array of objects and determine rough approximations of their shape. Specific applications in which polygon bounding has proven useful include pattern recognition, in the case of two dimensional objects, and virtual imaging in the case of objects defined in three dimensional space.

In the field of pattern recognition, a convex-polygon bounding method has been proposed by K. Yamamoto et al, *Recognition of Hand-Printed Characters By An Outermost Method*, Pattern Recognition, Vol. 12, pp. 229–236 (1980). The Yamamoto et al method approximates the convex hull of a discrete set of points. Approximate convex hull structures are generated by identifying, in the object to be bounded, a series of "outermost" contour points. Those points are sequentially connected to form the sides of the bounding polygon. For example, the letter "A" might be bounded by a polygon having a short horizontal upper side, a long horizontal lower side, and a pair of slanted intermediate sides.

Each side of the polygon so generated is inherently oriented at some angular rotation with respect to a fixed frame of reference. The angular rotations are determined solely by the positions of the contour points, which in turn are determined by the shape of the closed contour to be bounded. Thus, in the prior method, the angular rotations of the polygon sides, and even the number of sides, typically differ from polygon to polygon when different contours are considered. For example, the sides of a polygon constructed to bound the letter "A" would generally be fewer in number and have different angular rotations than a polygon bounding the letter "B". Polygons generated for different contours in accordance with the Yamamoto et al method therefore have few, if any, characteristics in common, and cannot be easily compared.

It is submitted that contour analysis could be significantly improved using convex-polygons having common characteristics, such as a predetermined number of sides and uniform rotational characteristics. In that way, information such as polygon size with respect to selected angular rotations could be easily compared relative to a plurality of polygons, regardless of the shapes of the bounded contours. It would be further desirable to provide a method for generating such convex-polygons in an efficient manner using minimal processing resources. For example, in known character recognition systems, closed contours are detected during one pass over a binary image array representation. It would be convenient to obtain at the same time a convex-polygon bound on that contour. This would simplify classification of the object represented, as well as the computation of intersections, point membership and other topological relations.

What is needed, therefore, is a class of bounding polygons allowing computational advantages that are inherent in their geometrical characteristics, as well as a fast method for generating such polygons as an extension to the classical one-pass algorithm for finding connected components in binary images.

SUMMARY OF THE INVENTION

In accordance with the foregoing objectives, an apparatus and computer-implemented polygon bounding method generate, in a first step, a binary array representation of a closed contour input object relative to a reference coordinate system. Subsequently, in a single pass through the binary array, a bounding polygon is generated as a sequence of parallel "bands," each representing a pair of opposing sides of the polygon. The polygon bands are oriented at successive generally uniform rotations of the reference coordinate system and are positioned to define the bounds of the closed contour for each rotation angle. The spacing and positioning of the bands can thus be used to define polygon size and position at each angle. In this way, comparisons between a plurality of polygons can be made systematically using defined geometrical criteria.

In a preferred aspect of the invention, each polygon band pair is defined by a pair of contour bounding displacements. The contour bounding displacements represent minimum and maximum contour distance values with respect to a selected axis (e.g. the horizontal "x" axis) of the reference coordinate system, as it is positioned through each angle of rotation. Advantageously, the contour bounding displacements at each rotation angle can be determined by mapping the contour displacement values into the coordinate system at that angle. Contour point displacements (interval end points) are determined for each row of the input array, for each rotation angle. Global minimum and maximum displacements for each rotation angle are found by replacing the largest value found at a given angle by the next value computed, if that next value is still larger. The final minimum and maximum for each angle are stored in an output table.

In still another aspect of the invention, the mapping procedure is performed by selecting rotation angle approximation values representing rational tangents of the form $m_\theta/n_\theta$, wherein successive $m_\theta$ and successive $n_\theta$ values differ by at most 1. This facilitates determination of the contour displacement, for each rotation angle, by simply incrementing and decrementing the reference system displacements in accordance with a predetermined sequence over the range of angles.

BRIEF DESCRIPTION OF THE DRAWINGS

FIG. 1 is a block diagram showing a data processing system constructed in accordance with the present invention.

FIG. 3a is a diagrammatic illustration of a document image containing a closed contour object.

FIG. 3b is a diagrammatic illustration of a binary array representation of the document image showing a reference coordinate system relative thereto together with selected incremental rotations of the reference coordinate system (shown in phantom), and further showing minimum and maximum contour bounding displacements relative to selected rotations of the reference coordinate system.

FIG. 4 is a diagrammatic illustration of an interval table generated in accordance with the present invention.

DETAILED DESCRIPTION OF THE PREFERRED EMBODIMENTS

Figure 2:
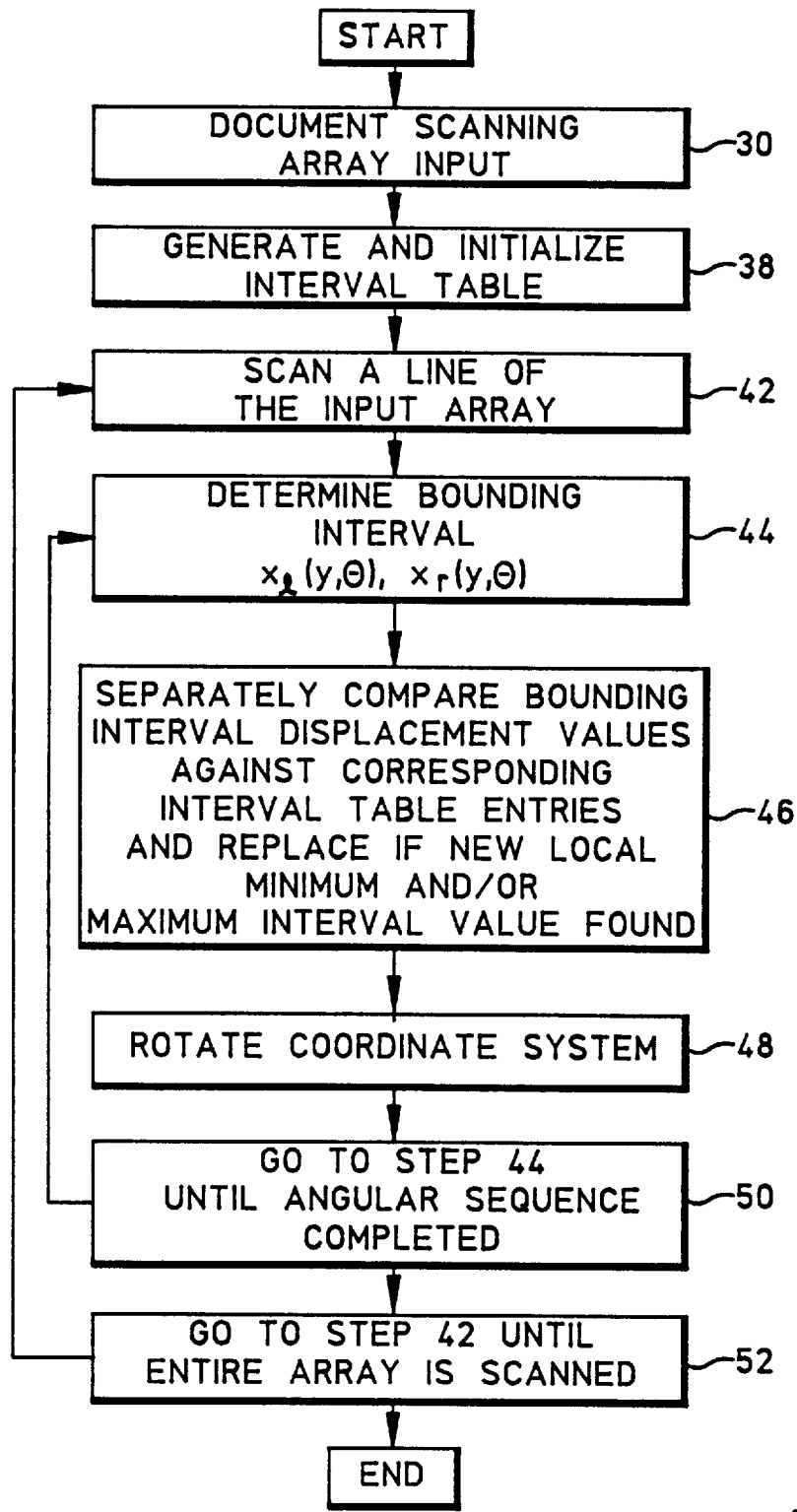
FIG. 2 is a flow diagram showing a preferred method in accordance with the present invention.

Turning now to FIG. 1, a character bounding system for evaluating closed contour images in accordance with a preferred embodiment of the invention is constructed from a data processing apparatus 10. The data processing apparatus 10 includes a processing unit 12, a data input system 14 for the input of data as well as command and control information, a data output system 16, and one or more data storage resources 18. The processing unit 12 includes a plurality of storage register locations 20 as well as local program memory 22 for storing and processing instructions from a compiled computer program 24. The data processing apparatus 10 may be constructed from any number of programmable general purpose computers and data processing systems. Preferably, the apparatus includes a document scanner as part of the data input system 14, or some other mechanism for inputting data files representing input images. The data processing apparatus 10 is configured to perform the method of the present invention using a software program written in the well-known "C" programming language, although it will be understood that many other programming languages could be used to generate a suitable instruction set.

CONSTRUCTION

Referring now to FIG. 2, a method for generating closed contour bounding polygons is shown diagrammatically. In a first process step 30, an input graphics image 32, as shown in FIG. 3a, having a closed contour, is converted using a document image scanner of the data input system 14, to a binary array representation 34, as shown in FIG. 3b. The binary array representation 34 is a data structure defining a plurality of array locations arranged in a series of rows and columns relative to a reference coordinate system 36. By convention, array locations having a value of 1 are assumed to identify darkened portions of the closed contour image, while array locations having 0's represent undarkened portions of the scanned image. As an alternative to scanning, a previously generated array representation 34 could be input to the data processing apparatus 10 as a data file by conventional file handling methods.

The preferred method for generating a bounding polygon representation of the closed contour input image 32, is to scan the binary array representation 34 in a line-by-line (row-by-row) sequence in the direction of the "y" axis of the reference coordinate system 36. The closed contour portion of the array 34 is defined for each scan line, by an interval of "x" coordinate values, including a minimum interval endpoint value "$x_1$" on the left side of the contour and a maximum interval endpoint value "$x_r$ on the right side of the contour. The entire closed contour is thus represented in the reference coordinate system as a sequence of such intervals, $[x_1(y), x_r(y)]$, where y ranges between the first scan line of the contour, $y_b$ (bottom), and the line at which the contour closes, $y_t$ (top).

If only a rudimentary polygon is desired, such as a bounding rectangle, the reference coordinate system scan interval sequence may be used directly. In a bounding rectangle, for example, the left side is $\min\{x_1(y)\}$, the right side is $\max\{x_r(y)\}$, and the bottom and top are $y_b$ and $y_t$, respectively. A disadvantage of bounding rectangles and other simple shapes is that they are of limited use for object classification, and for determining the actual proximity of plural closed contour objects. That is because the bounding rectangle is generally a poor approximation of the contour. Thus, in order to improve object classification and proximity determination, the notion of a bounding rectangle must be generalized to that of a bounding convex polygon consisting of an arbitrary fixed number of pairs of opposite parallel sides, instead of just two such pairs. This requires that the bounds of the object be computed along multiple fixed directions in a plane.

As shown in FIG. 3b, it is desired to construct a convex polygon having opposing sides or bands at generally uniform incremental rotations of the reference coordinate system 36. This is done by mapping the scanline interval end displacement values from the reference coordinate system through a sequence of angular rotations. Because the bounds on a contour at an angle $\theta$ are also the bounds at $\theta+\pi$, the rotational domain can be restricted to $0 \leq \theta < \pi$. It is assumed that $x_1(y,\theta)$ and $x_r(y,\theta)$ are the minimum/maximum limits of a scan interval of the reference coordinate system 36, rotated by angle $\theta$. The coordinate system 36 is assumed to have its origin at the lower left hand corner of the image. To maintain consistency, $y_b$ becomes $x_r$ and $y_t$ becomes $x_1$ under a rotation left by $\pi/2$, with the mapping changed accordingly for a right rotation.

Referring now to FIG. 2, the first step in the polygon construction process following input of the array 34 is to initialize in process step 38 an interval table 40, as shown in FIG. 4. The interval table 40 is a data output structure that defines for each angular rotation of the reference coordinate system 36, the global minimum and maximum contour bounding intervals $x_1(y,\theta)$, $x_r(y,\theta)$, and the scanline y on which they are found. The interval table 40 thus provides the output representation of the constructed bounding polygon. Following initialization of the interval table 40, a first line of the input array 34 is scanned in process step 42 and a contour bounding interval $x_1(y_n,\theta_n)$ and $x_r(y_n,\theta_n)$ is determined for the reference coordinate system 36 ($\theta_n$=0) in process step 44. In process step 46, the left and right bounding interval displacements $x_1(y_n,\theta_n)$ and $x_r(y_n,\theta_n)$ are separately compared against the corresponding $\theta_n$ entries for the previous scanline (if any) in the interval table 40 (i.e., $x_1(y_{n-1},\theta)$, $x_r(y_{n-1},\theta)$. If one or both are larger, they are stored as a new local minimum, maximum bounding interval $\theta_n$. In process step 48, the coordinate system rotation is implemented by mapping the interval values $x_1(y,\theta_n)$, $x_r(y,\theta_n)$ to the next rotation angle $\theta_{n+1}$. In step 50, the process returns to step 44 to determine the next left and right interval displacements $x_1(y,\theta_{n+1})$, $x_r(y,\theta_{n+1})$. Process steps 44–50 are repeated until the selected angular range e.g. $0 \leq \theta \leq \pi$, is covered. In process step 52, the process returns to step 42 and the next scanline is considered. Process steps 42–52 are repeated until the array is fully scanned.

FAST COMPUTATION

For each angle $\theta$ representing a rotation of the coordinate system, the global minimum and maximum contour bounding displacement values are represented by the bounds $[l_\theta, r_\theta]$, where $$l_\theta = \min_y \{x_l(y,\theta)\}, \quad (1)$$

$$r_\theta = \max_y \{x_r(y,\theta)\}.$$

Using simple geometry, the x-displacement of a reference system coordinate point (x,y) with respect to axes rotated by an angle θ is $$x_\theta = x \cos\theta + y \sin\theta. \quad (2)$$

It is preferred to compute equation (2) with integer operations. To do so, the rotational angle θ is first approximated by an angle having a rational tangent, $m_\theta/n_\theta$, where the improper expression for the tangent at π/2 is freely written as a shorthand for the corresponding sine/cosine pair. Equation (2) can now be written in the form $$x_\theta = \frac{1}{\sqrt{m_\theta^2 + n_\theta^2}} (n_\theta x + m_\theta y). \quad (3)$$

The second step in converting equation (2) to an integer computation is based on the observation that computing the minimum and maximum interval values in equation (1) requires only comparison operations, so that the values in equation (3) may be scaled for convenience. Delaying multiplication by the (generally irrational) factor $$s_\theta = \frac{1}{\sqrt{m_\theta^2 + n_\theta^2}},$$

equation (1) becomes $$l_\theta = s_\theta \min_y \{n_\theta x_l(y) + m_\theta y\}, \quad (4)$$

$$r_\theta = s_\theta \max_y \{n_\theta x_r(y) + m_\theta y\},$$

where the final products are rounded to the nearest integer. An alternative approach is to omit multiplication by the scale factor $s_\theta$ at this point, leaving the intervals in proportional units and performing inverse transformations on other data as required. Although a case can be made for this alternative in some application environments, the multiplication is indicated here in order to simplify later notation.

Because application of the constant factor $s_\theta$ is delayed in calculating equation (4), exact integer computation of the (proportional) displacement at θ involves at most three multiplies. This allows the implementation of fast computation methods, such as limiting m/n to direct or inverse powers of two, or using multiplication tables when the coordinate range is reasonably small.

In order to maintain rotational invariance, at least to the accuracy afforded by the number of angles chosen, the angles would ideally be spaced equally. But then the integer values comprising the approximating rational tangents will not have properties that would allow a reduction in the number of multiplication operations in equation (4). Instead, a set of angles is chosen whose tangents have convenient computational properties, while introducing an acceptably small error in the even distribution of angles. To divide the range $0 \leq \theta \leq \pi$ into $2^{n+2}$ parts, the following sequence of $m_\theta/n_\theta$ tangents may be used:

$$\left\{ \frac{0}{2^n}, \frac{1}{2^n}, \ldots, \frac{2^n}{2^n}, \frac{2^n}{2^n-1}, \ldots, \frac{2^n}{0}, \frac{2^n}{-1}, \ldots, \frac{2^n}{-2^n}, \right. \quad (5)$$

$$\left. \frac{2^n-1}{-2^n}, \ldots, \frac{1}{2^n} \right\}$$

In this sequence of tangents, $m_\theta$ runs through the numerators while $n_\theta$ runs through the denominators. Since successive elements of these sequences differ by at most one, it requires at most an addition to form a product in equation (4) for a given tangent as a function of the corresponding product for the previous tangent. The initial value $2^n$ is generally constant for the entire computation. Using this scheme to generate 32-sided polygons, the maximum error in angular approximation occurs at π/16 and is 0.07 radian.

Figure 5:
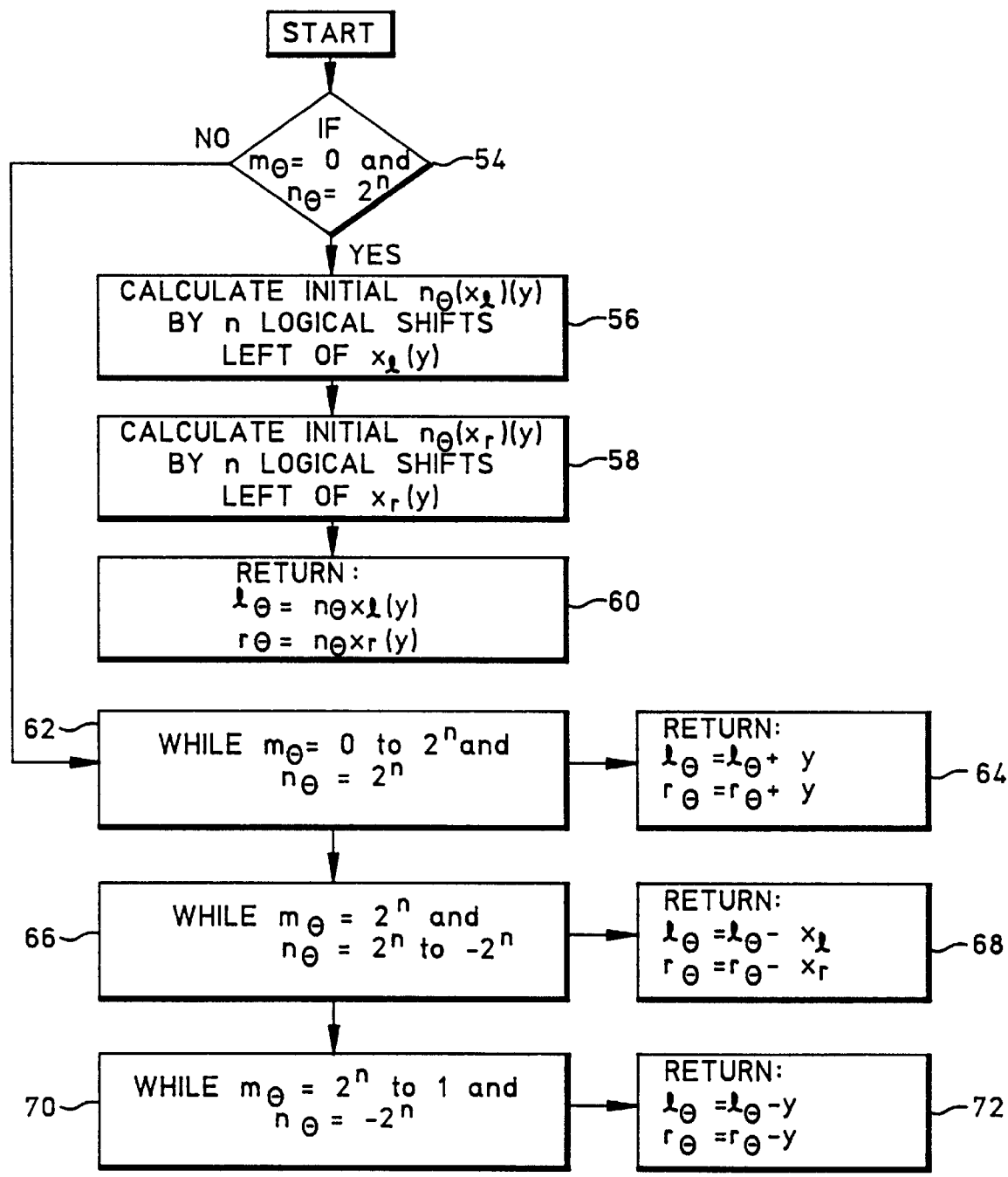
FIG. 5 is a flow diagram showing a fast computational method for performing contour point interval mapping.
Figure 6:
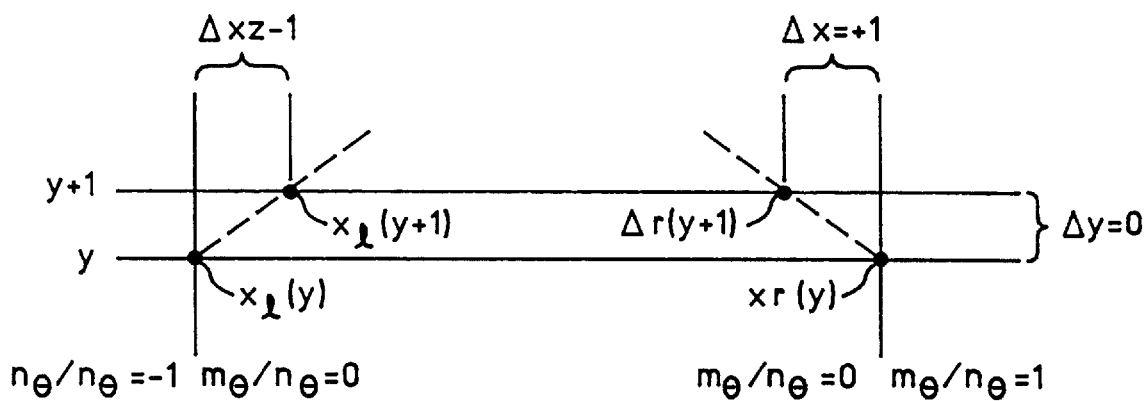
FIG. 6 is a detailed diagrammatic illustration of a binary array representation of a closed contour image showing a relationship between minimum and maximum contour displacement values in successive scan lines warranting a termination of further rotational processing for the first of the illustrated scan line pair.

FIG. 5 illustrates a preferred fast computation method for performing the coordinate system rotation step 48 of FIG. 2. It is assumed that prior to implementation of the coordinate system rotation step 48, a sequence of rational tangents $m_\theta/n_\theta$, such as the sequence (5) above, has been selected. In a first series of coordinate system rotation steps 54–60, the equation (4) components $n_\theta x_l(y)$ and $n_\theta x_r(y)$ are computed using the initial $n_\theta$ sequence value $2^n$. For a 32-sided polygon formed by 16 rotations of the reference coordinate system 36, the value of n is 2 such that there are $2^{n+2}=2^4=16$ rotations. The first $n_\theta$ value is thus $2^n=2^2=4$. The first $m_\theta$ value is zero in accordance with sequence (5). To calculate $n_\theta x_l(y)$ where $n_\theta=2^n$, it is only necessary to shift the value $x_l(y)$ n places. This can be efficiently performed by placing the value $x_l(y)$ determined for the reference coordinate system in one of the processing unit shift registers 20 and performing n logical shift left operations. This operation is performed in process step 56 of FIG. 5. Similarly, to determine the equation component $n_\theta x_r(y)$ the reference system coordinate value $x_r(y)$ is placed in a processing unit shift register 20 and a logical shift left operation is performed n times. This operation is performed in step 58 of FIG. 5. There are two logical shifts left in the case of a 32-sided polygon. The equation (4) value $m_\theta y$, with the initial value $m_\theta=0$ is also equal to zero. Thus, for the first rotation angle, $x_l(y,\theta)$ is equal to the calculated value $n_\theta x_l(y)$, and $x_r(y,\theta)$ is equal to the calculated value $n_\theta x_r(y)$. These values are returned in process step 60 as the bounding interval values $x_l(y,\theta)$, $x_r(y,\theta)$ in step 44.

If it is determined in step 54 that a first rotation has previously been made, the process jumps to step 62 where the values $x_l(y,\theta)$ and $x_r(y,\theta)$ are determined by simple addition operations over a range of $m_\theta=0$ to $2^n$. Thus, following the first rotation using the $m_\theta/n_\theta$ sequence value $0/2^n$, the next angular rotation employs the $m_\theta/n_\theta$ sequence value $\frac{1}{2^n}$. Because the $n_\theta$ denominator value remains the same, the only operation required to map this rotation is to add the value $m_\theta y$ to each of the previous $x_l(y,\theta)$ and $x_r(y,\theta)$ values. For $m_\theta=1$, the value $m_\theta y=y$. For subsequent rotations, the value of $m_\theta$ increases by 1. Thus, $x_l(y,\theta)$ and $x_r(y,\theta)$ at each subsequent rotation at which $n_\theta=2^n$ are determined by simply adding the value y to the previous $x_l(y,\theta)$ and $x_r(y,\theta)$ values. The condition $m_\theta=0$ to $2^n$ is tested in process step 62 and the mapped values $x_l(y,\theta)$ and $x_r(y,\theta)$ are returned in step 64 to the process step 44 as bounding intervals for each new rotation angle. Process steps 62 and 64 are repeated until $m_\theta=2^n$. At that point, the values $x_l(y,\theta)$ and $x_r(y,\theta)$ are determined by process steps 66 and 68. Process step 66 tests to determine that $n_\theta$ is in a range between $2^n$ and $-2^n$. In this range, the value of $n_\theta$ is sequentially decremented by 1 until $n_\theta=-2^n$. The operation of decrementing the denominator $n_\theta$ by 1 changes the values $n_\theta x_l(y)$ and $n_\theta x_r(y)$ by subtracting $x_l$ and $x_r$, respectively, therefrom. The mapped values $x_l(y,\theta)$ and $x_r(y,\theta)$ are returned in process step 68. The final sequence of rotations is mapped in process steps 70 and 72 by holding the denominator value no constant at $-2^n$ and decrementing the numerator value $m_\theta$ from $m_\theta=2^n$ to $m_\theta=1$. This sequence is achieved by subtracting y from the values $x_l(y,\theta)$ and $x_r(y,\theta)$, for each rotation. The mapped values are returned in process step 72.

Thus, the mapping operation is easily achieved by an initial logical shift left operation followed by successive addition and subtraction operations.

A second opportunity for implementation efficiencies arises from the fact that there are transition angles associated with the interval endpoints as the scan moves between successive lines. The values of $\theta$ at which an interval endpoint minimum or maximum can change are determined by the transition angle of that endpoint when proceeding from line y to y+1. This function is expressed implicitly, for the left end, as $$n_\theta x_l(y+1)+m_\theta(y+1)<n_\theta x_l(y)+m_\theta y,$$

and this reduces to $$m_\theta/n_\theta < x_l(y)-x_l(y+1). \quad (6)$$

Similarly for the right end, $$m_\theta/n_\theta > x_r(y)-x_r(y+1) \quad (7)$$

Process step 48 can be readily modified to test for these conditions so that coordinate system rotations that cannot yield a new interval endpoint minimum or maximum values are not tested. FIG. 5 illustrates the importance of transition angles in a case where the left interval end displacement increases by 1 from line y and y+1 and the right interval end displacement decreases by 1 from line y to y+1. Applying equation (6), there can be no change in the left endpoint and y+1 will not be a new maximum until $m_\theta/n_\theta=-1$l. The right end point at y+1 will not be a new maximum until $m_\theta/n_\theta=1$.

TOPOLOGY

The term 'topology' is used in a general sense to refer to relationships between the above-described convex polygons which are set-oriented or metric in nature. Advantageously, it is not necessary to compute the actual polygon boundary in order to answer questions relating to comparative characteristics such as containment or proximity. Since the interior of the polygon is the intersection of bands, any such questions can be expressed equivalently as a conjunction of the same questions (or predicate) over the set of component bands.

A bounding polygon "A" of an object may be denoted by a set of bands $\{A_\theta\}$, where $\theta$ ranges over the set of angles that are chosen, and where that set will be the same for all objects. Because bands are nothing more than intervals, there is an elementary calculus of bands at the same angle, equivalent to the calculus of intervals on the line. The left-hand and right-hand limits of a band $A_\theta$ may be denoted by $L(A_\theta)$ and $R(A_\theta)$ respectively. The size of a band is then $$|A_\theta|=R(A_\theta)-L(A_\theta).$$

In order to measure the distance between two bands, the definition $$A_\theta \ominus B_\theta = \max(L(A_\theta)-R(B_\theta), L(B_\theta)-R(A_\theta)),$$

has the correct properties. If $A_\theta$ and $B_\theta$ are disjoint, then the above value is positive and equal to the distance between their closest limits. If the value is negative, then its magnitude measures the extent of overlap. The following are other important relations:

$$(x,y) \epsilon A_\theta \Leftrightarrow L(A_\theta) \leq x_\theta \leq R(A_\theta),$$

$$A_\theta \subset B_\theta \Leftrightarrow L(B_\theta) \leq L(A_\theta), R(A_\theta) \leq R(b_\theta),$$

$$A_\theta \cap B_\theta = [\max(L(A_\theta), L(B_\theta)), \min(R(A_\theta), R(B_\theta))],$$

$$A_\theta \cup B_\theta = [\min(L(A_\theta), L(B_\theta)), \max(R(A_\theta), R(B_\theta))].$$

The band "axes" thus form a basis for a space of convex polygons. The relations listed above can be further extended using additional attribute definitions. In the following descriptions, roman capital letters without subscripts denote complete polygons over the sent of angles:

$$(x,y) \epsilon A \Leftrightarrow (\forall \theta) (x,y) \epsilon A_\theta.$$

the point can be said to fall within each band of A. For inclusion, $$A \subset B \Leftrightarrow (\forall \theta) A_\theta \forall B_\theta.$$

The check is simply that bands of A are contained within the corresponding bands of B. Note that for this predicate, and for point membership as well, if the result is negative it can generally be determined quickly by checking the condition in pairs—i.e., a band and its (perhaps approximately) perpendicular band. Two more operations which naturally distribute over bands are the following:

$$A \cap B = \{A_\theta \cap B_\theta\}.$$

$$A \cup B = \{A_\theta \cup B_\theta\}.$$

Based on the measures for bands, one can define $$\text{Length}(A) = \max_\theta |A_\theta|,$$

$$\text{Width}(A) = \min_\theta |A_\theta|.$$

One can define, as well, the dimension of a polygon along any of its axes. Distance generalizes as $$\text{Dist}(A,B) = \max_\theta A_\theta \ominus B_\theta.$$

The maximum over all band distances is the correct measure for polygon distance, because no two points on non-intersecting convex polygons can be closer, in the Euclidean sense, than any band distance. Fortunately, computing absolute distance is not as important to document analysis as testing proximity, which is defined as follows:

$$\text{Dist}(A,B) \leq \Delta \Leftrightarrow (\forall \theta) A_\theta \ominus B_\theta \leq \Delta.$$

It is not necessary in this case to compute Dist(A,B), but only to check the band distance at each angle until either the condition is not satisfied or it has been found true for all angles. Again, there is generally a rapid exit from the procedure for negative results. Thus, a judicious choice of the checking order can decrease execution time.

OBJECT CLASSIFICATION

A second advantage to defining the bounding polygon in terms of fixed directions is that there is then a degree of rotational invariance in gauging object structure. It is possible to define a line segment, for example, as an object with a length-to-width ratio between limits, or with length and width between absolute limits. If only one rectangle is used as the bounding figure, only horizontal or vertical lines can be detected. When an array of bounding bands are used, it is possible, to a tolerance determined by the number of angles used, to recognize a line in any orientation.

To take a slightly more complex example, consider the problem of recognizing dashed lines. Let LMIN be a parameter defining required line thinness, and let MINGAP and MAXGAP be parameters delimiting the gap size in a dashed line. A recursive step in recognizing dashed lines could utilize the following comparison: If L is a line segment or dashed line, and S is a line segment, then L∪S is a dashed line if Width(L∪S)≦LMIN and MINGAP≦Length (L∪S)−Length (L)−Length (S)≦MAXGAP.

Recognition of another common graphical shape, the circle or disk, is specified as condition that all bounding bands are, to within some tolerance, of the same size. Other approximations to shape may be specified as distributions of band size as well.

These examples illustrate the flexibility inherent in representing the bounding polygon as an array of bands in accordance with the invention. The array can be seen as a basis for any classification which can be done without analyzing the interior of the bounding polygon. Advantageously, it will be appreciated that weights could be assigned to the angles chosen, or the angles could be parameterized in other ways based for specific applications.

DRAWING THE POLYGON

As described above, it is not necessary to calculate the vertices of the bounding polygon in order to perform any of the operations discussed. In graphics applications, however, it is often desirable to distinguish an object by drawing its bounding polygon. Calculation of the boundary is also important in improving estimates of proximity. The proximity (within Δ) of two bounding polygons does not demonstrate the point-to-point proximity of the enclosed figures, but the error may be reduced considerably by inspecting actual picture elements in the interior of a polygon intersection.

Let $A^{+\Delta}$ be the polygon A extended on all sides by Δ. Denote the set of black pels in the interior of a polygon A by $I_b(A)$. Then a more refined test for the proximity of A and B is $$I_b(A^{+\Delta} \cap B) \neq \emptyset, I_b(A \cap B^{+\Delta}) \neq \emptyset.$$

If these conditions hold, then there is point-to-point proximity along some axis. The accuracy of this test increases with the number of polygon sides.

To calculate the polygon vertices, it is first noted that each side of the polygon is a line perpendicular to its θ axis through the origin, and at a distance d from the origin. The equation of such a line is $$n_\theta x + m_\theta y = d \sqrt{m_\theta^2 + n_\theta^2},$$

or, in the case under consideration, $$n_\theta x + m_\theta y = 1_\theta / s_\theta \text{ (or } r_\theta / s_\theta). \tag{6}$$

To calculate the vertices, it is only necessary to order the lines of equation (6), for example, by increasing angle and determining the intersections between adjacent lines in the (circular) sequence as the polygon vertices. Denoting the solution of equation (6) for $1_\theta$ as $L_\theta$ and for $r_\theta$ as $R_\theta$, the sequence is $$\{R_0, \ldots, R_{\theta<\pi/2}, L_{\pi/2}, \ldots, L_{\theta<\pi}, L_0, \ldots, L_{\theta<\pi/2}, R_{\pi/2}, \ldots, R_{\theta<\pi}\}.$$

The algebra need not be reproduced here, but it will be appreciated that the calculations are considerably simplified when using the angular sequence (5).

A class of convex polygons over fixed directions in the plane have thus been defined. It has been shown that the bounding polygons for all connected components in a binary image can be computed efficiently in one pass, and that a particular form of the procedure can be implemented using only shift and add operations. In addition, a basic algebra over the polygons can be used for efficient segmentation, low-level discrimination among basic object shapes, and recognition of complex objects consisting of disconnected components. While preferred embodiments and implementations of the invention have been shown and described, it is expected that modifications or adaptations thereof will be made by persons skilled the art. Accordingly, the scope of the invention should not be limited except in accordance with the spirit of the following claims and their equivalents.

I claim:

1. A computer-implemented pattern recognition method for characterizing a closed contour graphics image, including printed characters, using convex-polygon bounding of the closed contour image, comprising the steps of:

selecting an input graphics image containing a closed contour character to the recognized:

inputting a binary array representation of said closed contour input graphics image character relative to a reference coordinate system;

generating, in a single pass through said binary array, a stored character data output structure representing a convex-polygon defining the maximum and minimum contour bounds of said input graphics image character for each of a predetermined number of successive, equally sized incremental angular rotations of said reference coordinate system, wherein said contour bounds are defined by parallel lines or bands passing through minimum and maximum contour points on said image relative to each rotation of said reference coordinate system; and comparing said character data output structure with similarly generated character data output structures, or with predetermined parameters, in order to recognize said input graphics image character.

2. The method of claim 1 wherein said data output structure generating step includes the steps of scanning successive lines of said binary array and identifying, for each scan line, contour displacement minimum and maximum values relative to each rotation of said reference coordinate system, and adding said values to said data output structure if they represent global minimum and maximum values of said input image.

3. The method of claim 1 wherein said data output structure generating step includes the steps of:

generating and initializing an interval table for representing the bounds of the closed contour input image with respect to each rotation of said reference coordinate system, said interval table defining a set of rotation angle approximation values, and a pair of minimum and maximum contour displacement values associated with each of said rotation angle approximation values;

filling in said interval table in order to define a contour-bounding convex-polygon by scanning successive lines of said binary array, and for each scan line:

identifying successive bounding contour interval pairs representing minimum and maximum contour displacements with respect to each rotation of said reference coordinate system; and storing in said interval table one or both of the contour minimum and maximum displacement values if they exceed the values previously stored at corresponding locations in said interval table.

4. The method of claim 1 wherein said data output structure generating step includes rotating said reference coordinate system by mapping maximum and minimum contour displacement values relative to said reference coordinate system using angular approximation values.

5. The method of claim 4 wherein said coordinate system rotating step includes determining the maximum and minimum contour displacement values "$x_1,y$" and "$x_r,y$" relative to said reference coordinate system directly from said binary array, and generating mapped minimum and maximum contour displacement values $1_\theta$" and "$r_\theta$" by modifying said "$x_1,y$" and "$x_r,y$" coordinates in accordance with said angular approximation values.

6. The method of claim 5 wherein said angular approximation values are a sequence of rational tangents of a form $m_\theta/n_\theta$, wherein successive $m_\theta$ and successive $n_\theta$ values differ by at most one.

7. The method of claim 6 wherein said rational tangents m/n are selected to divide the angular range $0<\theta<\pi$ into $2^{n+2}$ parts in accordance with the predetermined sequence:

$\{0/2^n, \ldots, 2^n/2^n, 2^n/2^n-1, \ldots, 2^n/0, 2^n/-1, \ldots, 2^n/-2^n, 2^n-1/-2^n, \ldots, 1/-2^n\}$.

8. The method of claim 7 wherein said coordinate system rotating step includes determining the mapped minimum and maximum contour displacement values "$1_\theta$" and "$r_\theta$" in accordance with the relationships $1_\theta=n_\theta x_1(y)+m_\theta y$, and $r_\theta=n_{\theta x1}(y)+m_\theta y$, over the predetermined sequence of m/n rational tangent values.

9. The method of claim 8 wherein said coordinate system rotating step includes, for each scan line "y" of the binary array in said reference coordinate system, the step of mapping the minimum and maximum contour displacement values "$x_1,y$" and "$x_r,y$" to the rotated coordinate system values "$1_\theta$" and "$r_\theta$" by placing the values "$x_1$", "$x_r$" and "y" in data storage register locations and performing shift and add operations on said values.

10. The method of claim 9 wherein said coordinate system rotating step includes a first step of placing the "$x_1$" and "$x_r$" displacement values in first and second data storage register locations, and placing the scan line value "y" in a third data storage register location, a second step of determining the values "$n_\theta x_1$" and "$n_\theta x_r$" for the start of the predetermined m/n tangent sequence by performing a logical shift left on the "$x_r$" and $x_1$" values, and a third step of determining the mapped interval pair values "$1_\theta=(n_\theta 1_x+m_\theta y)$" and "$r_\theta=(n_\theta x_r+m_\theta y)$" by successively adding and subtracting the values "y", "$x_1$" and "$x_r$" in accordance with the change in m and n over the predetermined sequence of m/n tangent values.

11. The method of claim 10 further including the step of limiting the sequence of tangent m/n values over which said reference coordinate system is rotated upon determination that the difference between the "$x_1$" and "$x_r$" values for successive scan lines of the binary array are greater than or less than, respectively, the m/n tangent value.

12. In a programmable data processing apparatus including a central processing unit, a data input system, a data output system, and one or more data storage resources, a pattern recognition system employing character bounding for evaluating closed contour images, comprising:

means for inputting a binary array representation of one or more closed contour objects to be evaluated with respect to a reference coordinate system, said closed contour objects representing an input graphics image containing closed contour characters to be recognized;

means for generating from said binary array representation one or more stored convex-polygon representations of said closed contour objects of a form that includes a set of polygon bands oriented relative to said reference coordinate system and to a predetermined number of successive, equally sized incremental angular rotations of said reference coordinate system, said bands representing a convex-polygon defining the maximum and minimum contour bounds of said closed contour objects with respect to each of said angular rotations of said reference coordinate systems, wherein said polygon bands include pairs of minimum and maximum contour displacement values representing the bounds of the closed contour objects for each rotation of said reference coordinate system; and means for comparing said convex-polygon representations with similarly generated convex-polygon representations, or with predetermined parameters, in order to recognize said closed contour objects.

13. The apparatus of claim 12 further including means for comparing plural convex-polygon representations of said closed contour objects in order to isolate said objects and approximations of their shape.

14. The apparatus of claim 13 wherein said means for generating convex-polygon representations include a first means for scanning said binary array representation, a second means for determining the contour bands relative to said reference coordinate system, and a third means for incrementally rotating said reference system contour bands and adjusting them to bound the closed contour objects in the rotated directions.

15. The apparatus of claim 14 wherein said third means includes fourth means for mapping minimum and maximum contour displacement values from the reference coordinate system through successive rotations thereof by successively incrementing and decrementing the reference coordinate system contour displacement values in accordance with a predetermined sequence.

16. The apparatus of claim 15 wherein said fourth means includes fifth means for limiting said predetermined sequence upon determination that the change in minimum and maximum contour displacement values between successive scan lines of the binary array has reached a critical threshold.

17. The apparatus of claim 16 wherein said critical threshold is the approximate angle by which the reference coordinate system has been rotated.

18. A computer-implemented pattern recognition method for characterizing a closed contour graphics object using convex-polygon bounding of the closed contour object, comprising the steps of:

inputting a binary array representation of said closed contour object relative to a reference coordinate system;

generating, in a single pass through said binary array, a stored data output structure representing a convex-polygon defining the maximum and minimum contour bounds of said input closed contour object relative to successive, uniform rotations of said reference coordinate system, said contour bounds being determined by mapping pairs of interval endpoint values of the reference coordinate system by successively incrementing and decrementing the "x" and "y" coordinate values thereof in accordance with a predetermined sequence; and comparing said data output structure with similarly generated data output structures, or with predetermined parameters, in order to recognize said closed contour object.

* * * * *

UNITED STATES PATENT AND TRADEMARK OFFICE
CERTIFICATE OF CORRECTION

PATENT NO. : 5,832,127
DATED : November 3, 1998
INVENTOR(S) : Healey

It is certified that error appears in the above-identified patent and that said Letters Patent is hereby corrected as shown below:

Column 10, line 63, change the ":" to --;--.

Column 11, line 29, change "$n_\theta x1$" to --$n_\theta x_1$--.

Signed and Sealed this

Thirtieth Day of March, 1999

Attest:

Q. TODD DICKINSON

*Attesting Officer*  Acting Commissioner of Patents and Trademarks